United States Patent Office 3,208,766
Patented Sept. 28, 1965

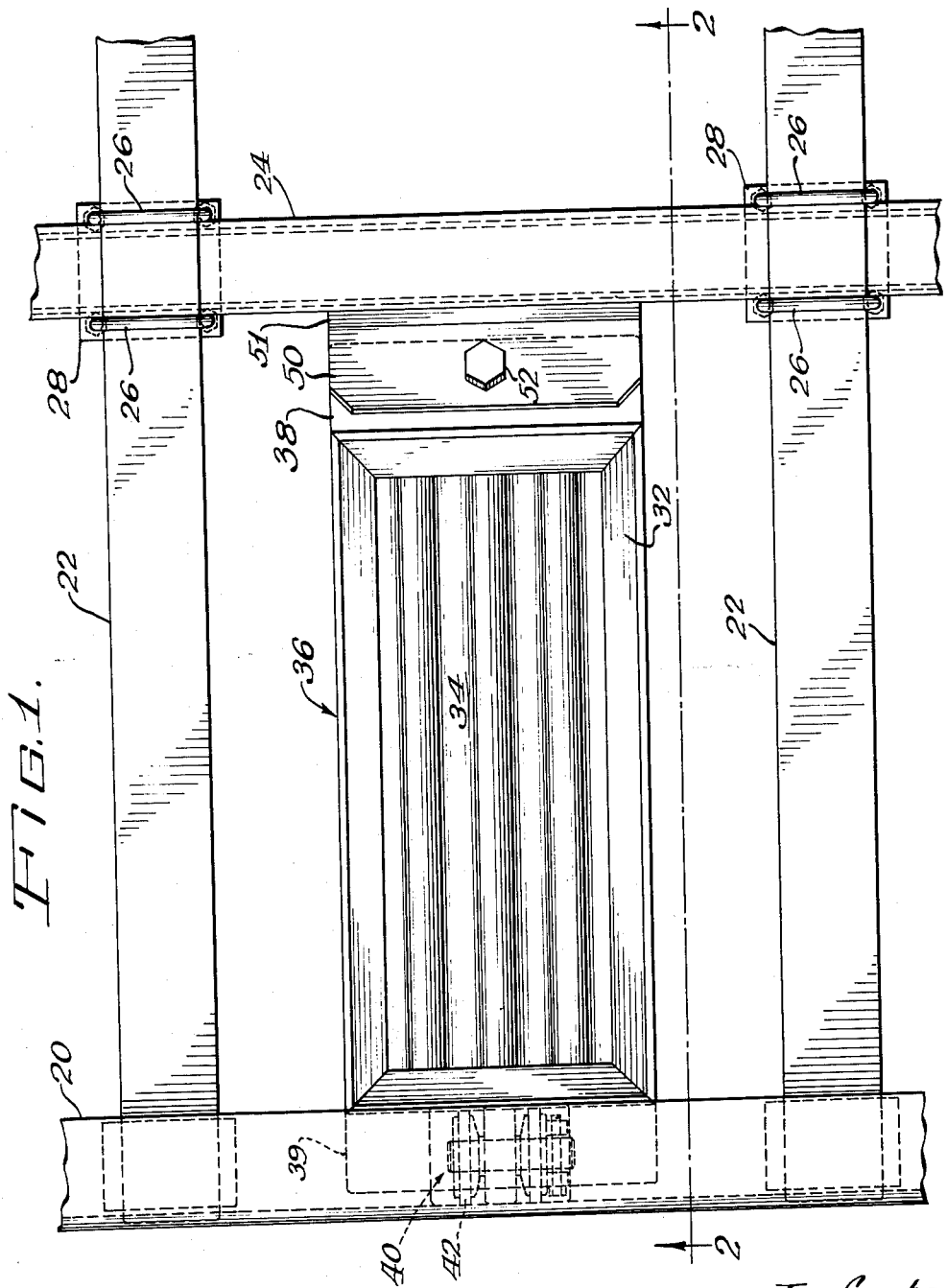

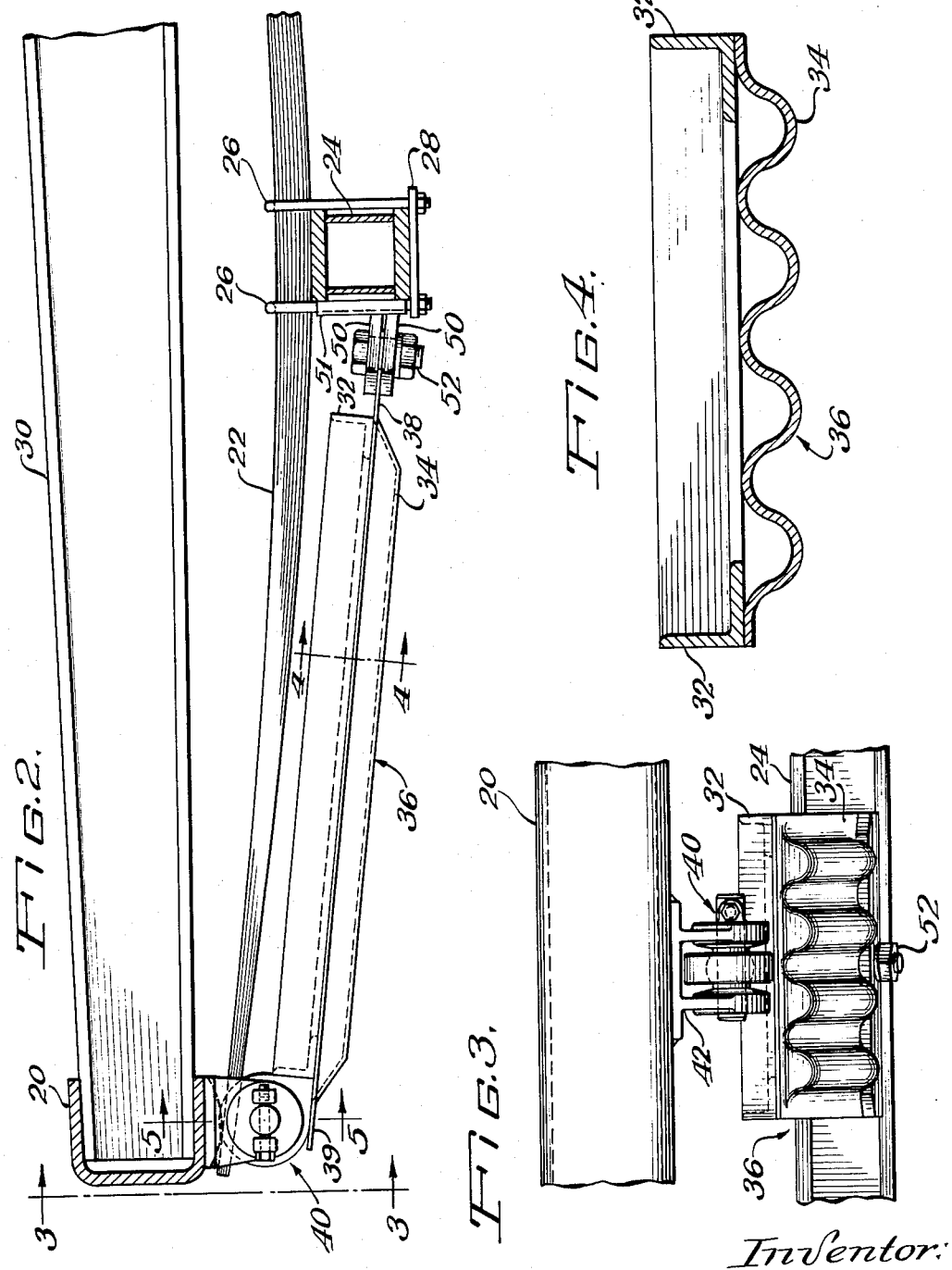

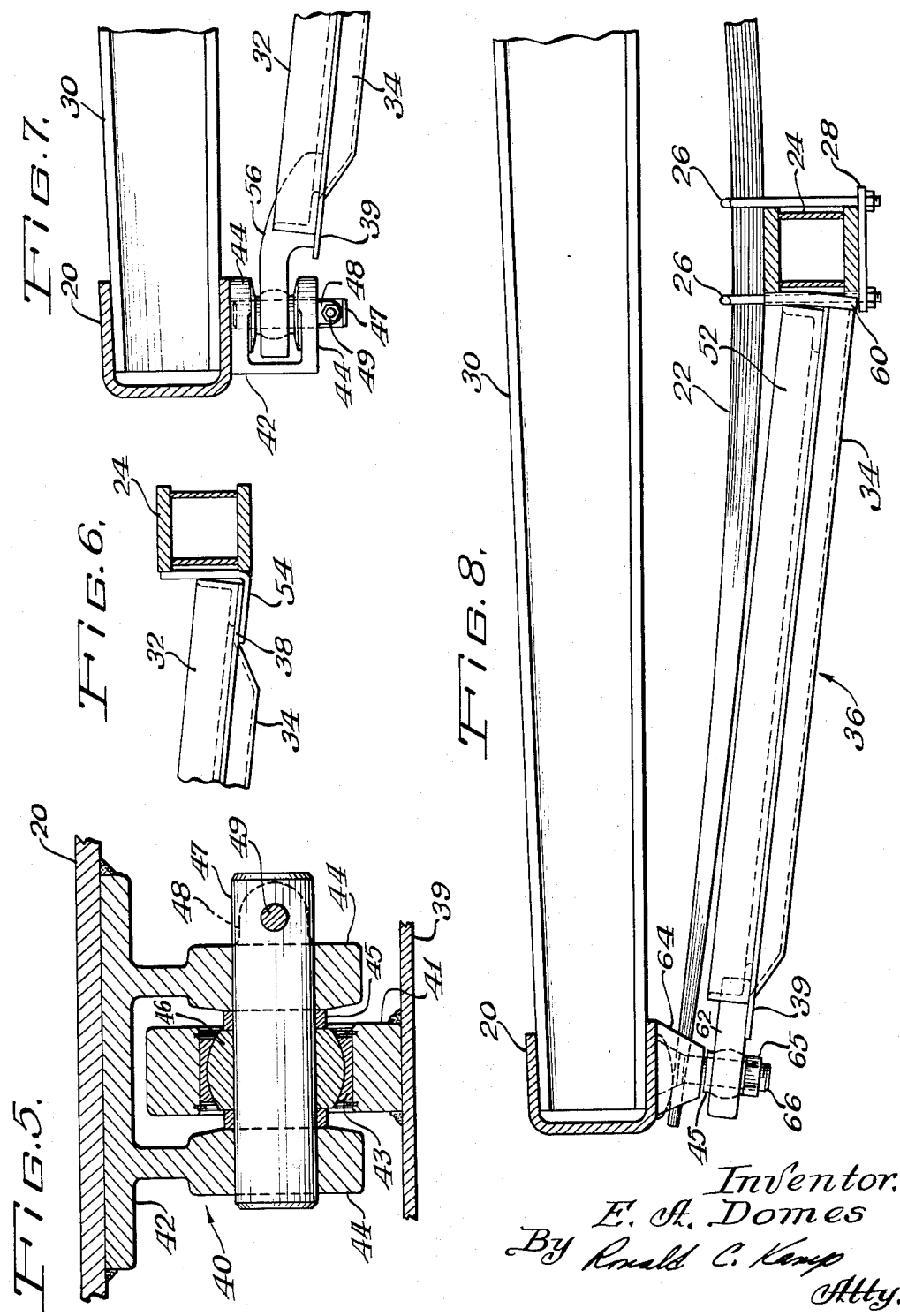

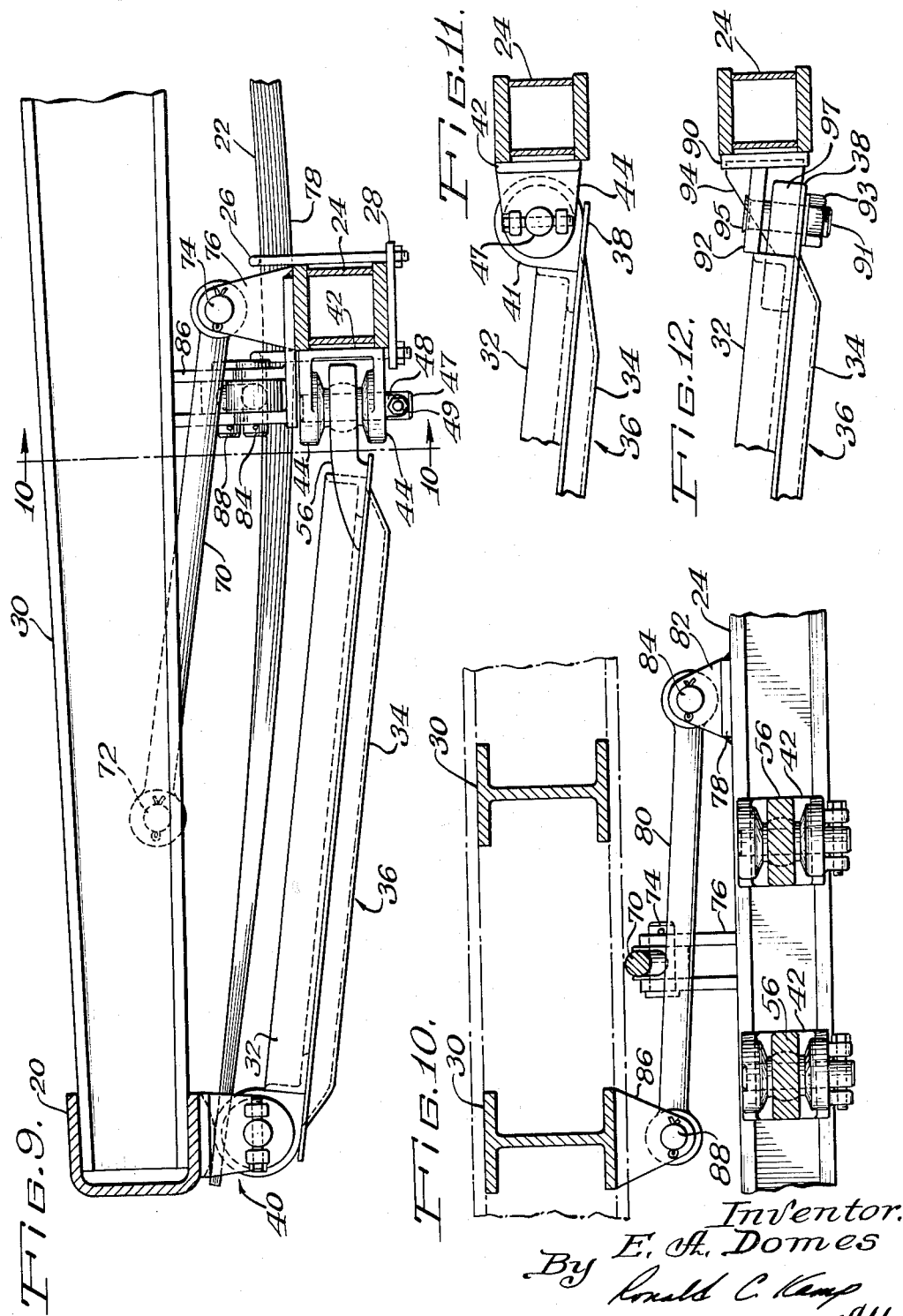

1

3,208,766
RIGID AXLE ATTACHING DEVICE AND
PROTECTIVE SHIELD
E. A. Domes, Wheaton, Ill., assignor to International
Harvester Company, Chicago, Ill., a corporation of New
Jersey
Filed Aug. 1, 1963, Ser. No. 299,394
4 Claims. (Cl. 280—124)

The present invention relates generally to means for attaching an axle to the chassis of a wheeled vehicle, and more particularly to a means for attaching a rigid axle which complements the suspension characteristics of the vehicle and also provides protection to the engine and transmission by preventing impacts with the ground.

In the operation of certain types of wheeled vehicles, e.g. tractors for use with scrapers, it is desirable to provide a high ground clearance because the terrain over which these vehicles must travel is rough and uneven. In order to minimize operator fatigue and insure safe and stable operation over such terrain, it is necessary to improve the ride condition by utilizing springs in the suspension system which have a large deflection. If a conventional pan guard were utilized with such a suspension system, it would have to be lowered to accommodate the oscillation of the suspension system and thus ground clearance would be reduced.

It is, therefore, an object of the present invention to provide an axle attaching means for a vehicle which will protect the engine and transmission, permit full oscillation of the suspension system, and still afford a high ground clearance.

It is a further object of the present invention to provide an axle attaching means which is both a pan guard and a radius rod.

It is a still further object to provide an axle attaching means which will position a rigid axle relative to the chassis and which will absorb the brake torque.

Another object is to provide an axle attaching means which will load the forward and rearward halves of individual leaf springs equally.

Still another object is to provide an axle attaching means which will maintain the axle perpendicular to the longitudinal axis of the chassis, while permitting transverse movement of the axle.

Other objects and many of the attendant advantages of the present invention will become apparent when considered with the following description and the accompanying drawings wherein:

FIGURE 1 is a top plan view showing one embodiment of the axle attaching means;
FIGURE 2 is a vertical section taken on line 2—2 of FIGURE 1;
FIGURE 3 is a front elevation taken on line 3—3 of FIGURE 2;
FIGURE 4 is a cross-sectional view taken on line 4—4 of FIGURE 2;
FIGURE 5 is a cross-sectional view, taken on line 5—5 of FIGURE 2, showing the details of the ball and socket;
FIGURE 6 is a side elevation showing a modified form of rigid connection to the axle;
FIGURE 7 is a side elevation showing a modified form of pivotal connection to the chassis;
FIGURE 8 is a side elevation showing another type of pivotal connection to the chassis and another form of rigid connection to the axle;
FIGURE 9 is a side elevation of a modification of the axle connecting means utilizing a pair of radius rods;
FIGURE 10 is a sectional view taken on line 10—10 of FIGURE 9;
FIGURE 11 is a side elevation of a modified form of pivotal connection to the frame; and

2

FIGURE 12 is a side elevation of still another modified form of pivotal connection to the frame.

Referring now to the modification shown in FIGURES 1–5, a cross-member or bumper 20 extends between and is attached to a pair of side rails 30 and define therewith the frame of the chassis for a wheeled vehicle. A pair of leaf springs 22 are attached by conventional means at their forward ends to the cross-member or bumper 20 and extend rearward therefrom substantially parallel to the longitudinal axis of the vehicle. A rigid axle 24 extends substantially perpendicular to the longitudinal axis of the vehicle and is attached to each of the leaf springs 22 by means of a pair of U-bolts 26, which engage a plate 28 on the underside of the axle 24. A pan guard, indicated generally as 36 and consisting of a frame 32 attached to a protective corrugated member 34, is secured at one end to the axle 24 and at the other end to the cross member 20. The corrugated member 34 is provided with flat extensions 38 and 39 on each end. The extension 38 on the rearward end is secured between the bifurcation 50 of an attaching member 51 by means of a nut and bolt 52. The single point of attachment allows the pan 36 to pivot in the plane of the bifurcations 50 about the bolt 52 while restraining it against vertical movement. The attaching member 51 is rigidly secured to the axle by conventional means, such as welding. The forward extension 39 is pivotally attached to the cross member 20 by means of a universal or ball and socket connector 40. The connector 40, which is shown in detail in FIGURE 5, consists of a bifurcated bracket 42 attached to the cross member 20 which has a pair of aligned holes in the downward extending arms 44. An annular member 41 is secured to the extension 39 and is provided with a socket portion 43 affixed thereto by snap rings. A tubular member 45, having an axial length substantially equal to the spacing between the inner edges of the arms 44, is provided with a ball portion 46 complementary to and engageable with the socket portion 43. A pin 47 extends through the aligned holes in the arms 44 and the interior of the tubular member 45. The pin 47 is held in position by a nut and bolt 49 which passes through a radial hole in the pin and an aligned hole in an ear 48 formed on one of the arms 44.

The ball and socket connector 40 permits approximately 15 degrees of motion in all planes. It is, therefore, apparent that the axle can move in response to contact by the wheel attached thereto with abrupt changes in ground contour. Since the pan guard 36 is a rigid member, the position of the axle is located and restrained with respect to the longitudinal axis of the vehicle i.e. the pan guard will function as radius rod. During any movement of the axle, the ground clearance will always be as great as that afforded by the axle itself since the pan guard is rigidly attached thereto, and the solid corrugated member 34 will protect the underside of the engine and transmission from being damaged by contact with ground obstructions. In addition, the semi-rigid connection of the pan guard to the axle permits the braking torque to be transmitted to the chassis, with the pan guard acting as the torque member, while at the same time providing transverse motion about the axis of the bolt 52, the springs being restrained by spring hangers, not shown.

A modified form of rigid attachment to the axle is shown in FIGURE 6. In this modification, the frame 32 extends over and is secured to the rearward extension 38 of the corrugated member 34. An angled bracket 54 is secured to the axle and to the underside of the extension 38. This means of rigid connection to the axle replaces the bifurcation 50 and the nut and bolt 52 shown in the modification of FIGURES 1–5.

A modified form of ball and socket connector, utilized to connect the pan guard 36 to the cross member 20, is shown in FIGURE 7. The bracket 42 is attached to the cross member by one of its arms 44 so that the arms 44 extend substantially horizontal rather than vertical and a bracket 56, which is secured to the extension 39, extends substantially horizontal between the arms 44. The bracket 56 is provided with a socket portion, similar to the socket portion 43 shown in FIGURE 5, which engages a ball portion on a tubular member 45. In all other respects, the ball and socket connector of FIGURE 7 is similar to that shown in FIGURE 5.

Another modification is shown in FIGURE 8 wherein the corrugated member 34 of the pan guard 36 is not provided with a rearward extension. Instead, a bracket 60, which is bent from the vertical by the same angle that the pan guard 36 normally makes with the horizontal, is attached to both the rigid axle 24 and the corrugated member 34 to effect a rigid connection therebetween. At the forward portion of the pan guard, a straight bar 62 is secured to the extension 39 and is provided with a socket portion, similar to socket portion 43 shown in FIGURE 5. A substantially frusto-conical member 64 is attached to the cross-member 20 and restrains the heads of a bolt 66 extending outwardly from an opening in the member 44. A tubular member 45 having a ball portion is positioned on the bolt 66 and is retained between the frusto-conical member 64 a nut 65 engaging the bolt 66. The ball portion on the member 45 engages the socket portion in the bar 62.

FIGURES 9 and 10 illustrate an embodiment of the present invention wherein the connection between the axle and the pan guard is not rigid. In this embodiment additional radius rods are utilized to transmit the braking torque to the chassis. In addition the radius rods are needed to transversely locate and restrain springs which do not provide adequate lateral control.

The pan guard 36 is provided with a ball and socket connector 40 at its forward end of the type shown in FIGURE 5. At the rearward end a pair of ball and socket joints, similar to the type shown in FIGURE 7, connect the pan guard to the rigid axle. A bifurcated bracket 76 is attached to the top of the axle 24. A radius rod 70 is pivotally attached to the bracket 76 by means of pivot pin 74. The radius rod 70 extends forwardly in a plane parallel to the longitudinal, vertical plane of the vehicle and is pivotally mounted on a bracket, not shown, attached to the chassis by means of pivot pin 72. This radius rod 70 assists the pan guard in locating and restraining the axle in a longitudinal direction and also aids in transmitting the braking torque to the chassis. A second radius rod 80 is pivotally secured to the rail 30 by means of a bifurcated bracket 86 and a pivot pin 88. The radius rod 80 extends in a plane perpendicular to the plane in which the other radius rod 70 is located, i.e., transverse to the chassis, and is pivotally attached to the axle 24 by means of a pivot pin 84 and bifurcated bracket 82, which is mounted on a plate 78 welded to the top of the axle. This radius rod 80 locates and restrains the axle in a transverse direction. In the event spring types without sufficient lateral stability are utilized in the suspension system, it is necessary to provide such stability.

Referring now to FIGURE 11, there is shown a ball and socket connector which is similar to that illustrated in FIGURE 5, except that the bracket 42 is mounted vertically rather than horizontally and is secured to the side of the rigid axle 24. This connection of the pan guard to the axle permits rotation about an axis parallel to the axle, which assures an equal loading being applied to each half of the individual leaf springs and thus a longer life for the spring. The reason for this equal loading is that the pan guard does not impart a twisting motion to the axle due to the pivotal connection.

FIGURE 12 shows a modified form of single pivotal connection to the rigid axle which is similar to that shown in FIGURES 1 and 2. A plate 90 is attached to the axle 24 and has a member 92 extending forwardly, parallel to the pan guard in its normal position. A bar member 97 is secured to the extension 38. A bolt 91 having a head 95 thereon extends through aligned holes in the member 92 and the bar member 97. The head 95 engages the top of the member 92 and is held in position by a nut 93. A positioning member 94 is secured to the members 90 and 92 and extends downward into sliding engagement with the rearward extension 38. This positioning member 94 spaces the member 92 from the bar member 97 and permits the pan guard 36 to pivot freely about the bolt 91 relative to the axle 24. By providing pivot movement about a vertical axis or nearly vertical axis, the axle is allowed to move in a transverse direction while maintaining a perpendicular relationship with respect to the longitudinal axis of the chassis.

It will be understood that various changes in the details and arrangements of parts, which have been herein described and illustrated in order to explain the nature of the invention, may be made by those skilled in the art within the principle and scope of the invention as expressed in the appended claims.

What is claimed is:

1. An axle attaching means for securing a rigid axle to the chassis frame of a wheeled vehicle comprising: leaf spring means secured to said chassis frame substantially parallel thereto, clamp means securing said rigid axle to said leaf spring means at substantially the center of said springs, a rigid pan-type protective member, means attaching said member to said axle on a pivotal axis which is substantially vertical whereby said axle will remain perpendicular to the longitudinal axis of said vehicle as it moves transverse to said longitudinal axis, and a universal connector attached to said member and to said chassis frame at a point forwardly of said axle, whereby said member will locate and restrain said axle with respect to the longitudinal axis of said vehicle while permitting said axle to oscillate in a substantially vertical plane.

2. An axle attaching means for securing a rigid axle to the chassis frame of a wheeled vehicle comprising: leaf spring means secured to said chassis frame substantially parallel thereto, clamp means securing said rigid axle to said leaf spring means at substantially the center of said springs, a rigid pan-type protective member of reinforced corrugated metal plate, means pivotally attaching said member to said axle on an axis substantially parallel to said axle, and a ball and socket connector attached to said member and to said chassis frame at a point forwardly of said axle, whereby said member will locate and restrain said axle with respect to the longitudinal axis of said vehicle while permitting said axle to oscillate in a substantially vertical plane transverse to said longitudinal axis.

3. The axle attaching means described in claim 2 and further including first and second radius rods each pivotally attached at one end to said axle and at the other end to said chassis frame, said first rod extending substantially parallel to said axle and said second rod extending substantially transverse to said axle.

4. A means for attaching a rigid axle to a wheeled vehicle having a chassis frame comprising: a pair of leaf springs attached at each end to said chassis frame and extending substantially parallel to the longitudinal axis of said vehicle, clamp means attaching said axle to substantially the center of each of said leaf springs, a rigid protective member having a transverse width less than the spacing between said leaf springs, a first universal connector securing said member to said chassis frame at a point forwardly of said axle, said connector being capable of permitting substantially 15 degrees of movement in all planes, said protective member secured to said axle in substantially the horizontal plane of said axle, and first and second radius rods each pivotally attached at one end to said axle above the plane of said protective member and each pivotally attached at the other end to said chassis frame above the plane of said protective member, said first rod extending substantially parallel to said axle and said second radius rod extending substantially transverse to said axle.

References Cited by the Examiner

UNITED STATES PATENTS

| | | | |
|---|---|---|---|
| 1,426,529 | 8/22 | Williams | 267—19 |
| 2,480,526 | 8/49 | Voltz | 280—124 |
| 2,692,778 | 10/54 | Stump | 280—112 |
| 2,746,766 | 5/56 | Nallinger | 280—124 |
| 2,934,334 | 4/60 | Davis | 267—19 |
| 2,955,842 | 10/60 | Stumo | 280—124 |
| 3,087,742 | 4/63 | Muller | 280—106.5 |

FOREIGN PATENTS 538,444  11/31  Germany.

A. HARRY LEVY, *Primary Examiner.*

LEO FRIAGLIA, *Examiner.*